(No Model.)  2 Sheets—Sheet 1.
J. A. BARNES.
FRICTION CLUTCH.
No. 531,014. Patented Dec. 18, 1894.
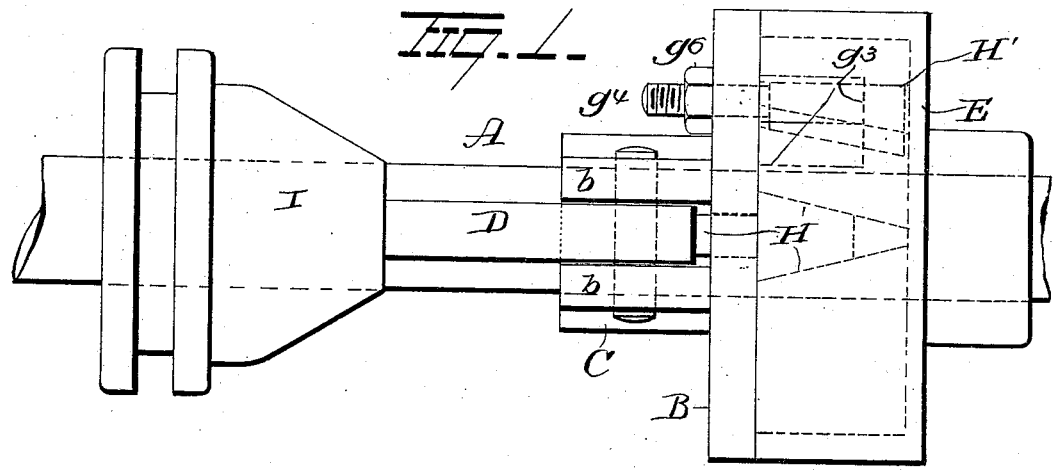
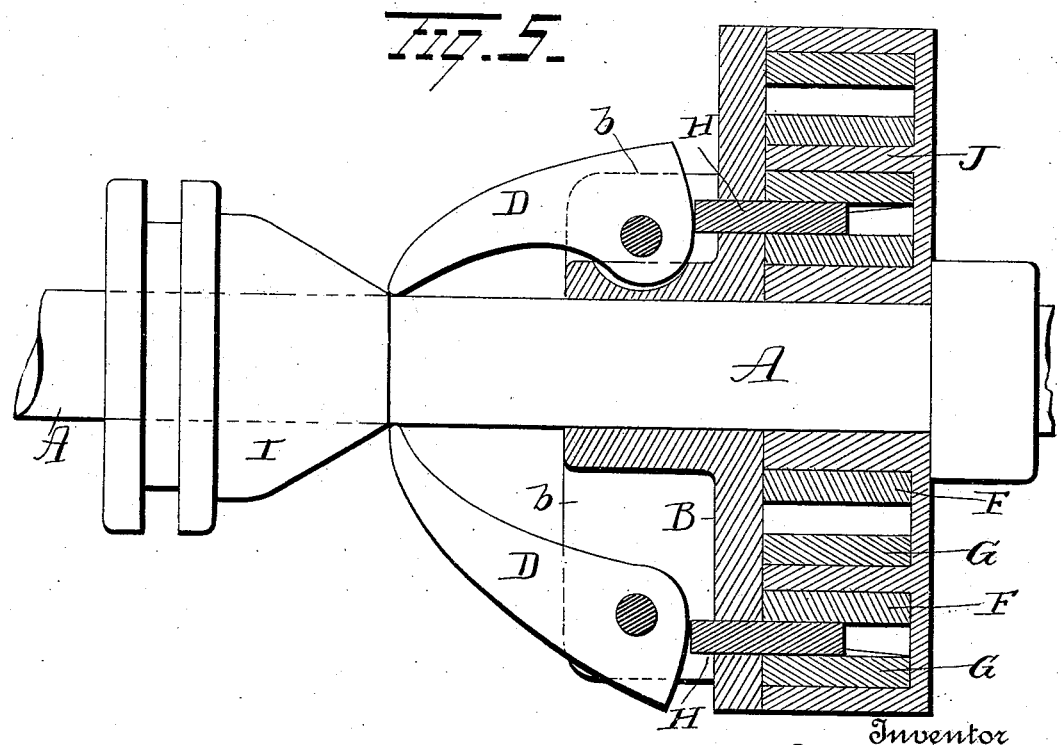
Witnesses
E. Hollingham
G. F. Downing
Inventor
J. A. Barnes
By H. A. Seymour
Attorney

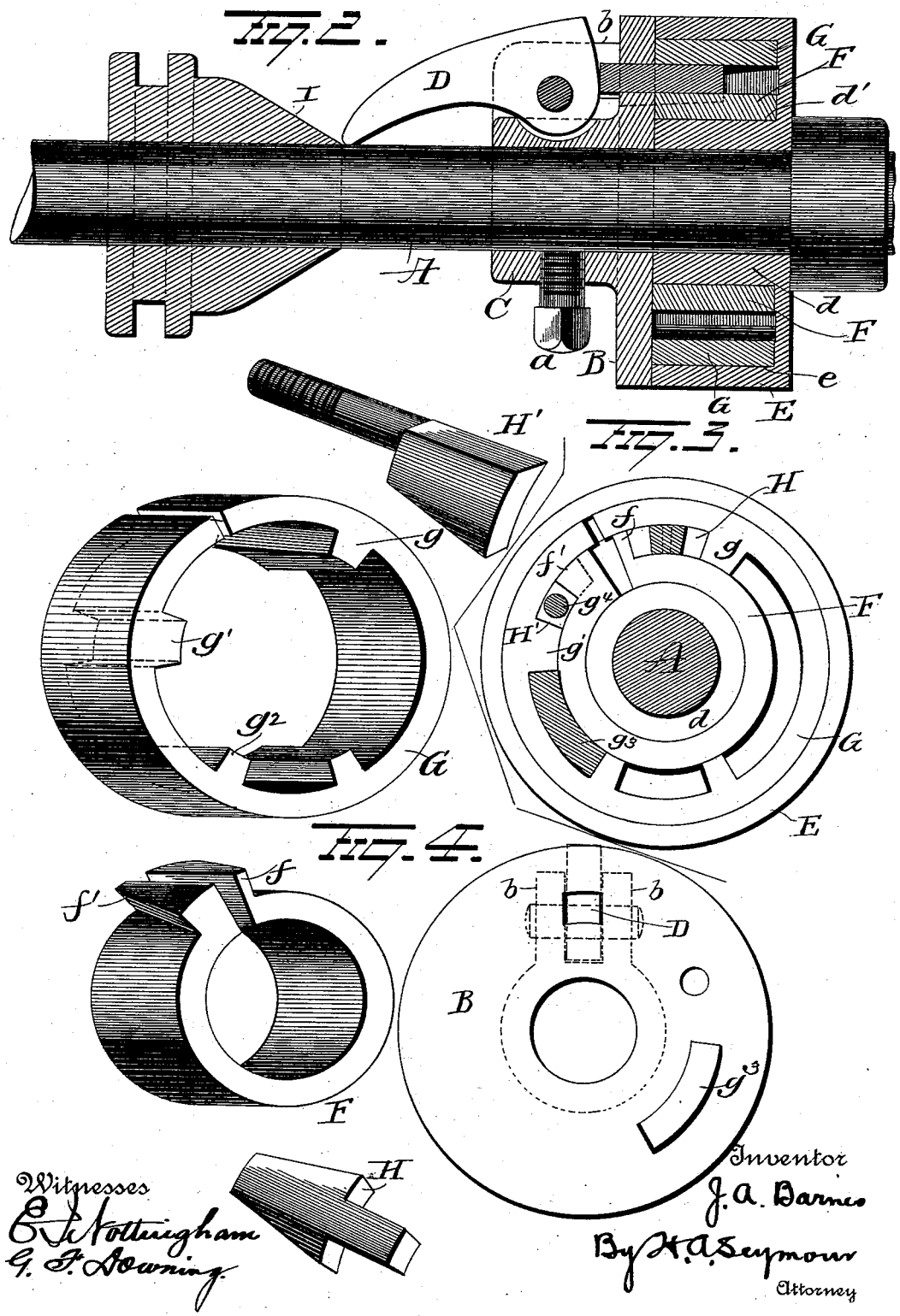

UNITED STATES PATENT OFFICE.

JOHN A. BARNES, OF WADSWORTH, OHIO.

FRICTION-CLUTCH.

SPECIFICATION forming part of Letters Patent No. 531,014, dated December 18, 1894.

Application filed May 17, 1894. Serial No. 511,589. (No model.)

*To all whom it may concern:*

Be it known that I, JOHN A. BARNES, of Wadsworth, in the county of Medina and State of Ohio, have invented certain new and useful Improvements in Friction-Clutches; and I do hereby declare the following to be a full, clear, and exact description of the invention, such as will enable others skilled in the art to which it appertains to make and use the same.

My invention relates to an improvement in friction clutches, the object of the same being to construct a clutch of few parts so arranged that they occupy but little space. A further object is to provide a clutch that is simple in construction, capable of being easily and quickly applied, that can be positively actuated at any time irrespective of the position of the several parts thereof, and which can be manufactured at a cost less than the cost of the clutches now commonly used.

With these ends in view my invention consists in parts and combinations of parts as will be more fully described and pointed out in the claims.

In the accompanying drawings, Figure 1 is a view in elevation of a clutch embodying my invention portions thereof being shown in dotted lines. Fig. 2 is a view in section lengthwise the shaft. Fig. 3 is a view in transverse section showing the wedges and split rings, and Fig. 4 is a view showing the several parts detached; and Fig. 5 is a sectional view of a modified construction.

A represents a shaft or axle on which is secured the disk B having the sleeve C. This sleeve is provided with a threaded opening for the passage of a screw $a$ designed to lock the sleeve and disk rigidly to the shaft or axle, and with lugs $b$ between which is pivoted the lever D.

E represents a cylindrical casing which can if desired be formed integral with or secured to a section of a shaft, wheel, pulley or drum. This casing is provided centrally with a hub $d$ slightly larger than the diameter of the shaft A so as to readily turn thereon, the outer face $d'$ of the hub, and the inner face $e$ of the casing being machined so as to form practically smooth bearing faces for contact with the friction rings by means of which the casing E is locked to disk B and caused to rotate therewith.

Mounted on the hub $b$ is the split spring ring F, which latter normally fits the hub so as to turn thereon, and is provided at its ends with outwardly projecting ears $f, f'$ the outer faces of which are oppositely beveled for a purpose to be hereinafter explained.

The ring F fits within the split ring G which latter snugly fits within the cylindrical casing so as to normally turn therein, and is provided with the inwardly projecting lugs or ears $g\ g'$ which latter are slightly removed from the ends of the ring thus leaving spaces between the lugs or ears $f f'$ and $g\ g'$ on the two rings F and G for the reception of the wedges H H'. The lug or ear $g$ is provided with an inclined or wedge shaped face so constructed and placed with relation to the lug or ear $f$ on the inner ring as to form a wedge shaped chamber between them for the reception of the wedge H. When this wedge is forced inwardly away from the disk B, it compresses the inner ring F around the hub of casing E and expands the outer ring G against the inner face of casing E thus locking the casing to the disk B which as before stated is fast to the shaft A. The ring G is also provided with a lug $g^2$ adjacent to lug $g'$ and between which the lug $g^3$ on disk B rests when the parts are assembled.

Wedge H' rests between lugs $f'\ g'$; the inclined face of the former resting in contact with the oppositely inclined face of lug $f'$, and is provided with a screw threaded shank $g^4$ which latter passes through an opening in the disk B, and is secured by nut $g^6$. By this arrangement the wedge can be moved in or out to properly adjust the rings with relation to the hub and inner face of the casing. This wedge when once adjusted remains permanently fixed until the parts require readjustment due to wear, while the wedge H is the wedge which actuates the rings to lock the casing to the disk B and shaft A. This wedge H projects through the disk B at a point behind the short end of lever D, and when lever D is rocked by the cone I the wedge is forced inwardly thus expanding the outer ring against the inner face of the casing and contracting the inner ring against the outer face of the hub, and thus locking the casing to the disk. By releasing the lever D, the inclined planes against which wedge H rests forces the wedge outwardly thus permitting the outer ring to contract and the inner ring to expand.

When the wedge H is in its normal position, the rings are free to revolve with the disk B, without communicating the motion to the casing E, but by simply forcing wedge H inwardly more or less by lever D, the rings engage the hub and inner face of the casing respectively and cause it to revolve also.

In the modification shown in Fig. 5, I have increased the size of the casing and added a flange J, two additional split rings and wedges, and an additional lever, the latter being arranged at approximately opposite points.

This coupling is designed for coupling shafts, and when so employed the casing E would be secured to one shaft and the disk B to the other. When employed for locking drums, pulleys, wheels, &c., to the shaft the casing is secured to the drum, pulley wheel, &c., and the disk E to the shaft.

This clutch is exceedingly simple in construction, is positive in its operation, takes up but little space and can be manufactured at a cost less than the cost of clutches now commonly employed.

It is evident that many slight changes might be resorted to in the relative arrangement of parts herein shown and described without departing from the spirit and scope of my invention. Hence I would have it understood that I do not wish to restrict myself to the exact parts herein shown; but, Having fully described my invention, what I claim as new, and desire to secure by Letters Patent, is—

1. In a clutch the combination with a casing having an internal hub, of a split ring embracing the hub and provided with outwardly projecting lugs near its ends, a split ring adapted to snugly fit within the casing and provided with inwardly projecting lugs, a wedge adapted to enter between one of the outwardly projecting lugs on the inner ring and inwardly projecting lug of the outer ring, and a lever for forcing said wedge inwardly between the lugs, substantially as set forth.

2. The combination with a shaft, a casing having an internal hub, two split rings located within said casing and provided with ears or lugs as shown, a fixed wedge located between one pair of said ears or lugs and a movable wedge located between the other pair of lugs, of a disk secured on the shaft, and a lever carried by the disk and adapted to engage the movable wedge.

3. The combination with a shaft, a disk rigidly secured thereon, a lever pivoted to the disk and a projection on the inner face of the disk, of a casing loosely mounted on the shaft, two split rings located within the casing, each ring having projecting lugs or ears, a wedge located between an outwardly projecting lug on the inner ring and an inwardly projecting lug on the outer ring, said wedge adapted to be engaged by the lever, the projection on the disk resting between two inwardly projecting lugs on the outer ring, substantially as set forth.

4. The combination with a shaft a disk thereon and a lever pivoted to the disk, of a casing having two split rings each provided with projecting ears or lugs, a wedge located between a lug on the outer ring and a lug on the inner ring, the said wedge passing through the disk and held in place by a nut, and a movable wedge located between a lug or ear on the outer ring and a lug or ear on the inner ring the last named wedge adapted to be engaged by the lever, substantially as set forth.

In testimony whereof I have signed this specification in the presence of two subscribing witnesses.

JOHN A. BARNES.

Witnesses:
   I. L. NASH,
   GEO. D. HIB.